Figure 1:
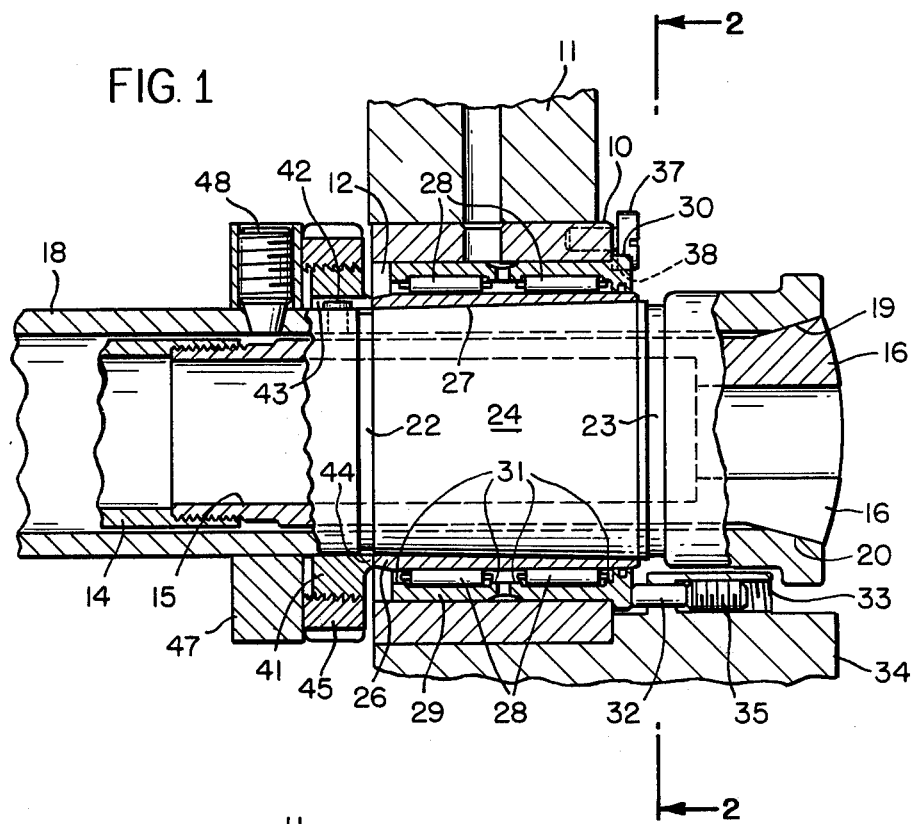

United States Patent [19]
Brinkman

[11] 3,936,104
[45] Feb. 3, 1976

[54] BEARING ASSEMBLY FOR SCREW MACHINE SPINDLE

[75] Inventor: Earl W. Brinkman, Rochester, N.Y.

[73] Assignee: Davenport Machine Tool Division of Dover Corporation

[22] Filed: Jan. 28, 1975

[21] Appl. No.: 544,848

[52] U.S. Cl. .............................................. 308/151
[51] Int. Cl.[2] ....................... F16C 23/00; F16C 35/08
[58] Field of Search .............................. 308/31, 151

[56] References Cited
UNITED STATES PATENTS

| | | | |
|---|---|---|---|
| 709,821 | 9/1902 | Kilburn | 308/151 |
| 715,526 | 12/1902 | Tyberg | 308/151 |
| 1,047,187 | 12/1912 | Farnham | 308/151 |
| 2,609,254 | 9/1952 | Harris | 308/151 |

*Primary Examiner*—Lloyd L. King
*Attorney, Agent, or Firm*—Shlesinger, Fitzsimmons & Shlesinger

[57] ABSTRACT

The assembly includes an outer race secured in one of the spindle bores in the revolving head of an automatic screw machine, and an inner race or sleeve which is adjustably secured to the associated work spindle. A plurality of roller bearing elements mounted in the outer race roll on the periphery of the sleeve to rotatably journal the forward end on the spindle in the head. The sleeve has a tapered, truncated-conical bore which mates with a complimentary taper formed on the outer periphery of the spindle. By rotating an adjusting nut on the spindle, the sleeve can be driven axially on the spindle in a direction which causes it to be slightly expanded radially to take up any undesirable radial play in the bearing assembly.

7 Claims, 2 Drawing Figures

BEARING ASSEMBLY FOR SCREW MACHINE SPINDLE

This invention relates to automatic screw machines, and more particularly to a machine having an adjustable bearing assembly for removing excess play from bearings in which the machine's work spindles are journaled.

The rotating work spindles of an automatic screw machine must be carefully mounted if they are to provide the accuracy desired during machine operation. Of particular importance is the front spindle bearing, which journals the forward or collet-operating end of the spindle in the revolving, work-indexing head on the machine. If there is any undesirable play in this bearing, the associated spindle, and the work chucked therein, will not be held accurately during a machining operation.

It is an object of this invention to provide improved means for journaling the work spindles in the indexing head of an automatic screw machine, thereby to eliminate undesirable runout or play.

Another object of this invention is to provide relatively simple and accurate take-up means for removing undesirable play from the front end work spindle bearings of automatic screw machines.

A more specific object of this invention is to provide a novel bearing assembly which is adjustable to take up or remove any undesirable radial play present in bearings of the needle type used to journal work spindles of an automatic screw machine.

Other objects of the invention will be apparent hereinafter from the specification and from the recital of the appended claims, particularly when read in conjunction with the accompanying drawing.

Figure 2:
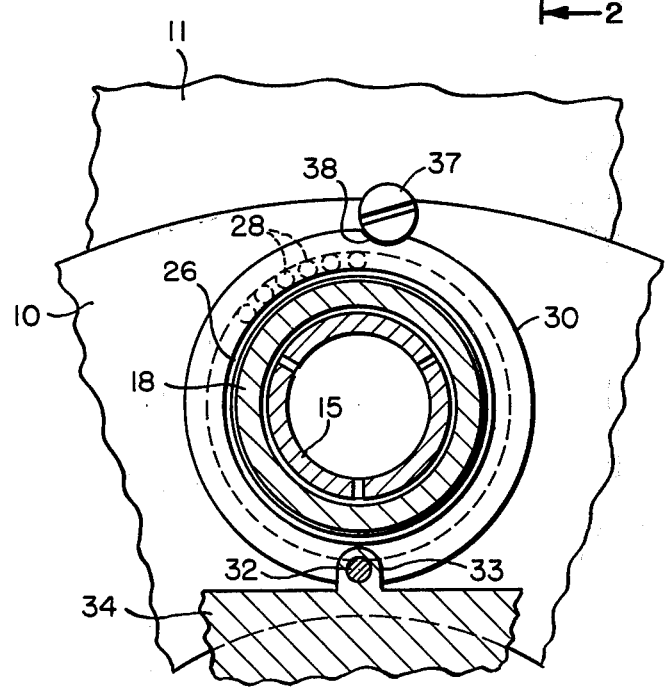

In the drawing:

FIG. 1 is a fragmentary, axial sectional view of a screw machine work spindle and an adjustable bearing mount therefor made according to one embodiment of this invention, a portion of the spindle being shown in full; and FIG. 2 is a fragmentary sectional view taken along the line 2—2 in FIG. 1 looking in the direction of the arrows.

Referring now to the drawing by numerals of reference, 10 denotes the revolving head of a multi-spindle automatic screw machine, which is mounted in known manner for rotary indexible motion between the stationary head cap 11 and the machine bed (not illustrated). Head 10 carries a plurality of parallel work spindles, each of which projects at its forward end through one of a plurality of circular bores 12 (only one of which is shown in FIG. 1), which are arranged in equi-angularly spaced relation around the axis of rotation of the head.

Each of the work spindles comprises an inner spindle 14 for housing the feed finger (not illustrated) which operates in known manner to shift a bar of stock progressively and intermittently to the tools (not illustrated) in the machine. Threaded onto the forward end of this inner spindle is a flexible, collet-type guiding and gripping chuck 15. The chuck 15 is slotted in the usual manner to form on its front end a plurality of gripping fingers 16 for gripping and centering the bar stock during machining operations thereon.

The inner spindle 14 is mounted coaxially within an outer spindle or collet-closing sleeve 18, which has an internal conical surface 19 at its forward end to cooperate with the external conical surfaces 20 formed on the collet fingers 16, so that when the sleeve 18 is moved forwardly on spindle 14, as noted hereinafter, the fingers 16 are compressed on the bar of stock to grip the work in the spindle.

Adjacent its forward end the sleeve 18 has in its outer periphery a pair of axially spaced annular, grooves 22 and 23, which are located at opposite sides, respectively, of the head 10. Between these two grooves the portion 24 of the outer periphery of spindle 18 in truncated conical in configuration, such that its outer diameter decreases slightly and progressively from front groove 23 to rear groove 22.

Surrounding the tapered surface 24 on spindle 18 is a metal sleeve or inner race 26, which together with the outer race or sleeve 29 forms part of a roller bearing unit that supports the forward end of the spindle 18 in the head 10. The outer surface of sleeve 26 is cylindrical; and its inner peripherial surface 27 has a truncated conical configuration complementary to the tapered surface 24 on spindle 18. Two sets of roller bearings 28, which are mounted to roll between the inner and outer races 26 and 29, are guided for rolling movement between annular thrust lips 31 formed on the inner periphery of the outer race 29.

Race 29 is mounted coaxially in the bore 12 in the head 10 so that a circumferential flange 30 on its right end, or forward end as illustrated in FIG. 1, overlies the face of head 10 around its bore 12. The race 29 is secured against axial movement in bore 12 by at least one pin 32, which projects from a boss 33 formed on a plate 34 that is attached to the head 10 beneath the forward end of spindle 18. A set screw 35, which is threaded into the boss 33, urges the pin 32 axially against the forward end of race 29 to secure its flange 30 against the face of head 10.

The race 29 is held against rotation in bore 12 by the head of a screw 37, which threads into the face of head 10. The head of the screw 37 engages in an arcuate notch 38, which is formed in the periphery of the flange 30 on race 29.

Surrounding the spindle 18 rearwardly (to the left in FIG. 1) of the head 10 is an externally threaded adjusting ring 41, which has a reduced diameter portion 44 projecting from its forward end (FIG. 1) into engagement with the rear (left) end of sleeve 26. Ring 41 is held against rotation on the spindle 18 by a pin or key 42, which is secured at one end in the spindle 18, and which projects at its opposite end slidably into an axially extending slot or way 43 formed in the inner periphery of ring 42. Threaded onto the ring 42 is an externally slotted adjusting nut 45, the rear side of which is engaged slidably with an annular stop 47, which is secured on the spindle 18 coaxially thereof by three set screws, one of which is denoted at 48.

To assure accuracy during the operation of the screw machine, it is essential that the spindle 18 revolve coaxially about its axial center line, so that the work held in its chuck 15 will likewise be revolved about its axis. At the outset, therefore, when the spindle and its roller bearing assembly are mounted in the head 10, the nut 45 is rotated in a direction to cause the adjusting ring 41 to be shifted axially forward, this axial movement being permitted by the key and way connection 42, 43. The rear face of the nut 45 abuts the stop 47, which is fixed to the spindle 18, so that as the ring 41 moves forward it drives the sleeve 26 forward on the tapered surface 24 of the spindle. Because of the complimentary tapered surface 27 on the sleeve 26, the sleeve is expanded radially by this movement, thereby reducing or eliminating any undesirable radial play or slack which might otherwise exist between the sleeve 26 and the surrounding needle bearings. Since the cooperating tapered and truncated conical surfaces 24 and 27 mate with one another, the radial stresses developed in the sleeve 26 will be uniform along its length, and will maintain the inner and outer surfaces of the sleeve 26 in coaxial relation to the spindle axis.

To get maximum thrust on the race 27, the ring 41 is provided with a buttressed thread the flat faces of which face rearwardly.

The spindle 18 is shiftable axially by a conventional yoke mechanism (not illustrated), or the like, effect the opening or closing of the collet fingers 16 relative to the work. Since the outer peripheral surface of the sleeve 26 is cylindrical, it can shift axially with the spindle 18 for the slight distance necessary to effect the opening or closing of the collet fingers, without creating any relative movement between the sleeve 26 and the spindle 18. During this axial movement of sleeve 26, the rollers 28 are held against axial movement by the thrust lips 31 formed on race 29.

From the foregoing it will be apparent that the instant invention provides relatively simple and inexpensive means to increase the accuracy of machining operations performed by automatic screw machines. By slight adjustment of the nut 45 the inner bearing sleeve 26 can be shifted axially on the tapered surface 24 on spindle 18 substantially to eliminate all undesirable radial slack or play in the bearing assembly. By way of example, the cooperating tapers on the surfaces 24 and 27 are selected so that, when the sleeve 26 is shifted axially on the spindle 18 approximately 0.125 inches, it will be radially expanded approximately 0.006 inches.

While only one work spindle and bearing assembly therefor have been illustrated and described in detail herein, it will be apparent that each work spindle in a screw machine may be journaled in bearing assemblies of the type described. Moreover, it is possible for the invention to be applied to any type of rotating shaft or spindle where it is desired to minimize undesirable run-out.

Although only one embodiment of the invention has been described in detail herein, it will be apparent that this application is intended to cover any further modifications of the invention which may fall within the scope of one skilled in the art, or the purview of the appended claims.

Having thus described my invention, what I claim is:

1. An adjustable bearing assembly for rotatably journaling a spindle in a support, comprising
a first sleeve surrounding said spindle,
a second sleeve surrounding said first sleeve and secured in a bore in said support,
a plurality of bearing elements mounted for rolling movement between the confronting peripheral surfaces of said sleeves,
the inner peripheral surface of said first sleeve being truncated conical in configuration and being engaged with a complimentary truncated conical surface formed on the outer periphery of said spindle, and
means on said spindle operable to shift said first sleeve axially on said spindle in a direction to cause said cooperating truncated surfaces to effect a slight radial expansion of said first sleeve.

2. An adjustable bearing assembly as defined in claim 1, including
means on one of said confronting peripheral surfaces operative to hold said bearing elements against axial movement relative to said one peripheral surface, and
said other of said confronting surfaces being cylindrical in configuration and slidable axially relative to said elements to enable slight axial movement of said spindle relative to said support.

3. An adjustable bearing assembly as defined in claim 1, wherein the tapers formed on said first sleeve and said spindle by said truncated conical surfaces are selected to effect a radial expansion in said first sleeve of approximately 0.006 per 0.125 inch of axial travel thereof on said spindle.

4. In an automatic screw machine wherein an axially shiftable work spindle projects through a bore in a revolving head of the machine, means for rotatably journaling said spindle in said bore, comprising
a sleeve adjustably secured on said spindle coaxially thereof and disposed in the bore in said head,
an annular bearing race surrounding said sleeve in radially spaced relation thereto,
means for securing said race in said bore in said head coaxially thereof,
a plurality of bearing elements mounted to have rolling movement in the space between said race and said sleeve, and operative rotatably to support said sleeve in said race coaxially thereof, and
means for adjusting the axial position of said sleeve on said spindle,
said spindle and said sleeve having thereon cooperating surfaces operative to effect a slight radial expansion of said sleeve, when the sleeve is shifted axially in one direction on said spindle.

5. In an automatic screw machine as defined in claim 4, where
the inner peripheral surface of said sleeve, and the part of the outer peripheral surface of said spindle surrounded by said sleeve, are truncated conical in configuration and are disposed in complimentary engagement with each other to define said cooperating surfaces which can effect radial expansion of said sleeve, and
said means for adjusting the axial position of said sleeve comprises an adjusting member mounted for axial sliding movement on said spindle and engaged at one end with one end of said sleeve, and
a manually operable member on said spindle drivingly engaged with said adjusting member and movable in one direction to drive said adjusting member toward said sleeve.

6. In an automatic screw machine as defined in claim 4, where said means for securing said race in said bore comprises
a circumferential flange integral with one end of said race and overlying the face of said head at one end of said bore,
means holding said flange against said face of the head to secure said race against axial movement in said bore, and
a member projecting from the face of said head and into a notch in said flange to hold said race against rotation in said bore.

7. In an automatic screw machine as defined in claim 4, where the outer peripheral surface of said sleeve is cylindrical in configuration and projects beyond one end of said race,
said bearing elements are parallel rollers having their axes disposed parallel to the axis of said spindle, and
a plurality of annular thrust lips project from the bore in said race at opposite ends of said rollers to prevent axial movement of said rollers relative to said race during axial adjustment of said spindle.

* * * * *